June 27, 1950  J. SOLOMON ET AL  2,513,064
ANTISKID TIRE TREAD
Filed Dec. 15, 1948
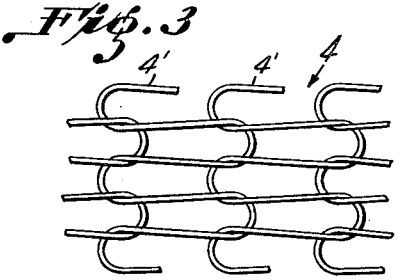
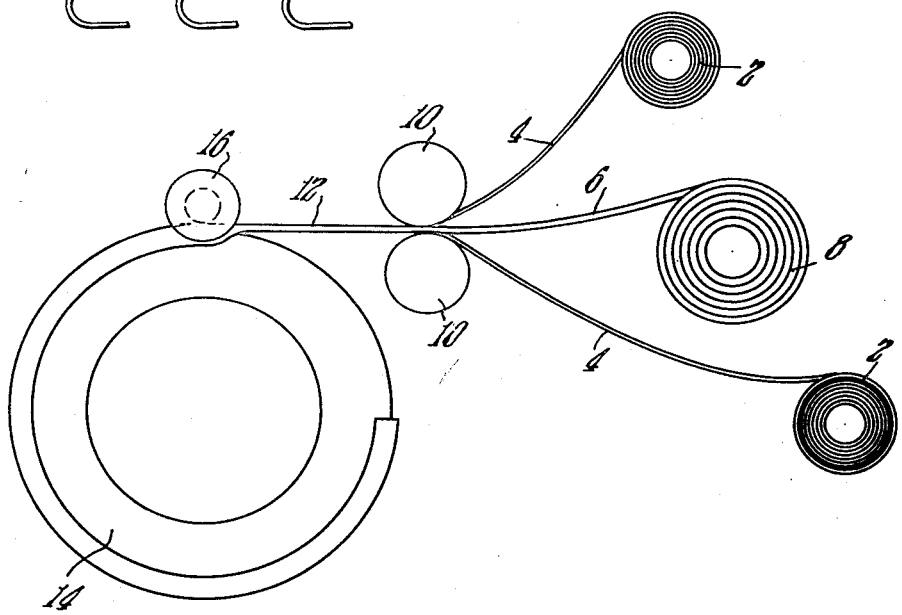
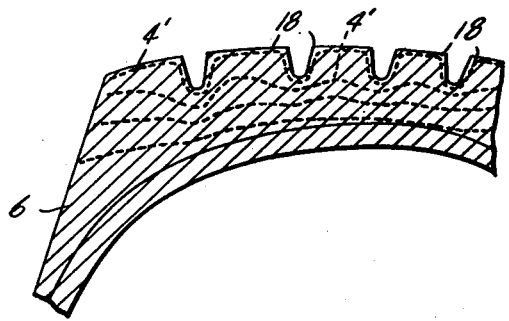
INVENTOR.
David Black & Joseph Solomon
BY Patented June 27, 1950

2,513,064

UNITED STATES PATENT OFFICE 2,513,064

ANTISKID TIRE TREAD

Joseph Solomon and David Black, Springfield, Mass., assignors to Victoria Tire Company, Springfield, Mass., a corporation of Massachusetts Application December 15, 1948, Serial No. 65,476

2 Claims. (Cl. 152—211)

Our invention relates to improvements in a composition of matter and to a method for making the same and it is directed more particularly to the provision of a composition in which rubber or a similar substance forms a base and has associated therewith loosely woven metallic fibres or elements.

It is the principal object of our invention to provide a new material which can be used in a variety of ways and is adapted for a myriad number of purposes. According to one of the novel features of our invention, we provide a composition which can be effectively used in vehicle tires, so as to permit the elimination of tire chains during those periods of the year when driving conditions are hazardous due to the presence of rain, sleet, ice or the like on the highways.

According to another of the novel features of our invention, we provide a new material which may be used on pneumatic tires for all types of vehicles including passenger, commercial and industrial types and like pieces of equipment.

Broadly, our invention relates to improvements in compositions of matter in which rubber, vulcanizable gums, and other similar substances provide a base and have dispersed therein fin-like or ribbon-like metallic elongated filaments.

Another principal object of our invention is to provide a composition of matter which shall have all of the characteristics of rubber, such as elasticity, pliability, and resistance to slipping on ice and snow, and which shall incorporate the added features of a substantially greater resistance to wear, and a non-puncturability from sharp points of various foreign substances, particularly glass.

A further object is to produce a composition of matter containing and embracing the foregoing characteristics which is particularly adapted for use not only on vehicle tires but also on rubber heels and other items which are subject to wear, and which may be molded or worked into various forms and articles which shall possess the aforesaid characteristics uniformly throughout the mass so formed, whereby the desired uniformity of wear and non-puncturability is promoted and extended.

A further object of our invention is to produce a composition of matter, the degree of toughness, pliability and softness of which shall be entirely due to the base and the materials incorporated therewith.

A further object of the invention is to construct a pneumatic tire with a knitted metallic fabric embedded within its tread portion to give that part stability and good wearing qualities and to produce the desired anti-skidding or anti-slipping effect, portions of the filaments being exposed through the surface of the tread, and the filaments being interwoven as to themselves so as to prevent any one of or any group of the wires from being stripped from the tire should it become caught in an object upon the road or otherwise engaged with a foreign object.

Another purpose of our invention is to provide an improved means for forming tire casings, so as to prevent effectively the breaking off of rubber fragments from the same and to insure further the longevity thereof.

Broadly, our invention comprises embedding in the non-skid tire casings a layer or layers of a composite fabric comprising strands of loose ribbon-like interbraided or interwoven strands of metal in the form of wire or wire filaments so as to hold rigidly such wires in position within the material of the tire itself.

A further feature of our invention comprises a disposition of the material within the tread portion of the tire so that the wire filaments are presented to the road surface at angles relative to the same whereby the wires form sharp burrs which increase the frictional resistance between the road surface and the tire and decrease the possibility of skidding or slipping.

It is a further purpose of our invention to provide a material meeting the above stated requirements more nearly than any prior material known in the art. To this end, I make a sheeted material composed mainly of a rubber or rubber compound but containing the distributed filaments or threads. These distributed filaments are so contained as to give a reinforcing action in all directions and to appear, in part, at the wearing surface, thus increasing the surface coefficient of friction and producing a substantially non-slip surface. In my material, these aforementioned characteristics persist as the material is gradually worn down through the body of rubber and fibres by continued use.

For purposes of clarity, certain definitions of terms used in the tire industry should be understood as these terms are used freely hereinafter in our specification. "Tread stock" is the material used in the tread portion of a tire. "Camelback" is uncured, compounded rubber used for recapping or retreading tire casings. The "tire carcass" is the foundation structure of a pneumatic tire consisting of several super-imposed layers of cord fabric which are insulated and/or coated. The carcass plus the bead is the air or pressure restricting part of a tire which provides support for the vehicle and resists bruising or fracture from impact. The "tire casing" is descriptive of the product made by combining the carcass, bead and tread parts into what is technically known as a pneumatic tire.

These objects we accomplish by means of such structure and relative arrangement of parts thereof, as will fully appear by a perusal of the description and by various specific features which will be hereinafter set forth.

To the above cited and other ends and with the foregoing and various other novel features and advantages and other objects of our invention as will become more readily apparent as the description proceeds, our invention consists in certain novel features of construction and in the combination and arrangement of parts as will be hereinafter more particularly pointed out in the claims hereunto annexed and more fully described and referred to in connection with the accompanying drawings wherein:

Fig. 1 is a diagrammatic elevational view for explaining our invention;

Fig. 2 is a transverse sectional elevational view through the tread portion of a tire incorporating the features of our invention; and Fig. 3 is an enlarged plan view of a portion of the knitted fabric used in the device of the invention.

In the above mentioned drawing annexed hereto and forming a part of this specification, we have shown but one embodiment of our invention which is deemed preferable, but it is to be understood that changes and modifications may be made within the scope of the appended claims without departing from the spirit of the invention.

Referring now to the drawing more in detail, more particularly to the preferred form of our invention selected for illustrative purposes, we have shown rolls 2 of metallic fabric 4. This fabric is in strip form and comprises a plurality of thin ribbon-like loosely woven metallic strands or filaments 4' which are woven or knitted together, so as to be interlocked. The filaments have a greater transverse width than thickness thereby to provide a multitude of sharp edges. Preferably the weaving or knitting will result in the sharp edges of the fabric being disposed outwardly relative to the faces of the fabric as wearing takes place.

The woven wire fabric 4 is treated by any suitable method with a solvent or cement such as Salvasol #2 having an affinity for the material of a base strip 6 usually referred to in the tire trade as tread stock or camelback. Salvasol is the commercial trade name of a gasoline product, same being a thinner for stimulating the adhesive qualities in raw rubber. The strip 6 may come from a roll 8 thereof.

There may be upper and lower fabric strips 4 and an intermediate base strip 6 or there may be as many strips of either fabric or tread stock or camelback as desired. The selected number of each will depend upon the particular composition desired.

One or more layers of the fabric will be incorporated in the composition depending on the thickness thereof; that is, there will be sufficient layers of the metallic fabric to provide a composition which has metallic elements dispersed throughout the base strip in such a way that as the composition wears filaments and/or edges thereof are always present at the expired surface.

The fabric 4 must be made from a loosely woven flexible metal as the metal has to be of a temper that will facilitate flexing and stretching with the stretching of the tread stock or camelback all as will presently be observed.

The base strip 6 may be of rubber, rubber composition, synthetic rubber or the like, but will be of such characteristics as to flow to some extent and to vulcanize and cure under the influence of heat and pressure.

Neither the fabric nor the base strip need come from a roll as shown but to facilitate the practice of the invention the roll forms may be desirable.

The fabric and base strips are subjected to pressure so that the metallic fabric is incorporated and dispersed into the base strip. This may be accomplished by rolling and pressure. In the form of the invention being illustrated, there are a pair of pressure rolls 10 through which the strips are passed.

It is desired in all cases that the metallic strip or strips, and therefore the ribbon-like filaments thereof, be dispersed throughout the base strip so that the edges of the filaments are generally outermost in the resulting composition and present a multitude of relatively sharp edges at the surface of the structure.

The metallic fabric, once incorporated in the base strip as it is, is not separable therefrom. There is provided a composite structure 12 wherein the base strip may function according to its normal characteristics while the metallic fabric functions to strengthen and to reinforce the resulting structure and at the same time to provide the desired anti-skid properties.

The composite structure may be employed for various purposes but for purposes of disclosure it is shown as being served around a tire carcass 14 one or several times. It may be rolled thereon by a concaved roll 16.

If desired, the longitudinal marginal edges of the fabric may be ruptured with transverse cuts extending inwardly thereof so as to facilitate the forming of the structure 12 around the transversely curving tire or carcass and to facilitate also the distention of combined fabric and camelback in the molding process shortly to be described.

With the camelback or tread stock thus served around the tire or carcass, the combination may be placed in a mold and subjected to heat and pressure in the well known manner.

That is to say, the metal is formed by interlocking ribbon-like metallic filaments as by weaving, knitting or the like and the interlocking is such that the filaments are relatively shiftable or the fabric is flexible. The flexibility will be such that when the composite structure is served in one or more layers about a tire carcass and the carcass is placed in a mold for vulcanizing or curing the metal fabric will become deformed or be displaced so as to be disposed in the tread depressions of the mold as the base material is caused to flow thereinto by internal pressure applied to the tire carcass as best shown in Fig. 2. This is important where the tire is to have a tread pattern commonly called "a molded tread design" which has ribs, buttons 18 or the like of greater height than with an ordinary tire tread and according to the invention in such a case the metal is displaced so as to be present in the buttons and even at the outer surfaces thereof.

As aforesaid the metallic fabric being uniquely woven or knitted for interlocking the filaments thereof, is pliable and moldable. It does not impair the flowability of the base material as occurs in the molding operation, in fact it is in itself readily moldable and deformable whereby the structure may conform to the pattern of the mold.

Where the structure is served about a tire carcass so there are superposed layers the metallic fabric of one layer may well interlock with those of another so that the tire has a unified, reinforced anti-skid tread portion.

Our invention may be embodied in other specific forms without departing from the essential characteristics thereof. Hence, the present embodiments are therefore to be considered in all respects merely as being illustrative and not as being restrictive, the scope of the invention being indicated by the appended claims rather than by the foregoing description, and all modifications and variations as fall within the meaning and purview and range of equivalency of the appended claims are therefore intended to be embraced therein.

What it is desired to claim and secure by Letters Patent of the United States is:

1. A pneumatic anti-skid tire construction comprising in combination, a carcass having an outer circumferential tread portion integral therewith formed of yieldable resilient material having spaced outwardly extending anti-skid projections, and a flexible layer of interwoven ribbon-like metallic filaments extending continuously across the tread portion and circumferentially of the tread portion and having a multiplicity of sharp edges disposed in the tread portion with portions of the filaments of said layer thereof distended outwardly into the anti-skid projections and presenting multiple longitudinal sharp edges adjacent and at the outer faces thereof.

2. A pneumatic anti-skid tire construction comprising in combination, a carcass having an outer circumferential tread portion integral therewith and formed of yieldable resilient material having spaced outwardly extending anti-skid projections, and a plurality of flexible layers of interwoven ribbon-like metallic filaments extending continuously across the tread portion and circumferentially of the tread portion and having a multiplicity of sharp longitudinal edges disposed in the tread portion with portions of said layers displaced from the median circumferential planes thereof outwardly into the projections.

JOSEPH SOLOMON.
DAVID BLACK.

REFERENCES CITED

The following references are of record in the file of this patent:

UNITED STATES PATENTS

| Number | Name | Date |
|---|---|---|
| 978,731 | Gautier | Dec. 13, 1910 |
| 1,012,030 | Underwood | Dec. 19, 1911 |

FOREIGN PATENTS

| Number | Country | Date |
|---|---|---|
| 17,258 | Great Britain | 1905 |
| 17,815 | Great Britain | 1907 |
| 218,533 | Great Britain | July 10, 1924 |